United States Patent Office 3,467,625
Patented Sept. 16, 1969

3,467,625
MODIFIED HOMO- AND COPOLYMERS OF FORMALDEHYDE OR TRIOXANE AND PROCESS FOR THEIR MANUFACTURE
Harald Cherdron and Hans Joachim Leugering, Wiesbaden, Edgar Fischer, Frankfurt am Main, and Klaus-Dieter Asmus, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Sept. 14, 1967, Ser. No. 667,669
Claims priority, application Germany, Sept. 21, 1966, F 50,248
Int. Cl. C08g 37/02
U.S. Cl. 260—67                                    2 Claims

ABSTRACT OF THE DISCLOSURE

Manufacture of shaped articles of polyoxymethylenes and copolymers of formaldehyde and trioxane with cyclic ethers with the addition of imidazole derivatives whereby the size of the spherolites in the polymers is reduced and their number per unit volume is increased.

---

The present invention relates to modified homo- and copolymers of formaldehyde or trioxane and to a process for their manufacture.

It is known that homo- and copolymers of formaldehyde or trioxane have a very pronounced tendency towards crystallization. Even in the case of a slight undercooling of the melt a rapid growth of spherolites is observed which are generally larger than the wave length of light and, therefore, impart a considerable opacity to the material. Moreover, due to the crystallization process numerous cracks and fissures develop in the interior of the material and on the surface. Owing to these cracks and fissures both the smoothness of the surface and the mechanical properties of the products are considerably impaired. The aforesaid flaws become the more pronounced the larger the individual spherolites are which depends, inter alia, on the processing conditions.

From the treatise by C. F. Hammer, T. A. Koch and J. F. Whitney, J. Appl. Polymer Sci. 1 (1959), 171, chapter 3, it follows that, when microscopic examinations of melt preparations of polymers of formaldehyde which have been placed between glass as well as metal plates are carried out, there is no indication of artificial nucleation.

Now we have found that shaped articles of homo- and copolymers of formaldehyde or trioxane with reduced spherolite size can be obtained in an advantageous manner by adding to the homo- and copolymers prior to the molding process compounds of the formula

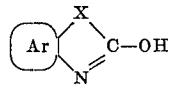

in which X represents the group >C=O, >NH or —CO—NH—, Ar represents benzene, naphthalene or diphenyl, and in which the total heterocyclic grouping may occur once or twice in the molecule, in an amount within the range of from $10^{-5}$ to $2 \times 10^{-1}$ percent by weight, preferably in an amount within the range of from $10^{-3}$ to $10^{-2}$ percent by weight. Examples of preferred compounds are 2,3-dihydroxy-quinoxaline, 2,6-dihydroxy-m-benzobisimidazole and 2,2'-dihydroxy-6,6'-bis-benzimidazole.

By the addition of these compounds, which do not melt at the processing temperatures of the polymer and which are only partially soluble in the liquid polymer, the structure of the polymer is essentially modified and the number of spherolites per unit volume increased by one to three powers of ten. It is remarkable that most of the additives that have been described as nucleating agents for polypropylene, for example, are entirely ineffective in the case of the homopolymers or copolymers of formaldehyde or trioxane.

By homopolymers of formaldehyde and trioxane there are to be understood polyoxymethylenes whose molecular weight is at least 10,000 and whose OH terminal groups are stabilized against thermal degradation by etherification or esterification. (Etherification of polyoxymethylenes with alcohols in the presence of sulfuric acid: U.S. Patent 2,512,950; etherification of the terminal OH groups of polyoxymethylene with aliphatic acetals in acid solution: Belgian Patent 570,884; esterification of the OH terminal groups of polyoxymethylene with acetic anhydride: British patent specification 770,717.)

By copolymers of formaldehyde or trioxane there are to be understood copolymers of 80 to 99.9 percent by weight of formaldehyde and 0.1 to 20% by weight of cyclic ethers, preferably of 80 to 99.9 percent by weight of trioxane and 0.1 to 20 percent by weight of cyclic ethers.

By cyclic ethers there are to be understood especially compounds of the formula

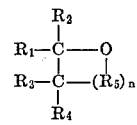

in which $R_1$, $R_2$, $R_3$ and $R_4$ each represent hydrogen, an alkyl radical or a halogen-substituted alkyl radical, and in which $R_5$ represents a methylene- or an oxymethylene radical, an alkyl- or a halogen-alkyl-substituted methylene radical, or an alkyl- or a halogen-alkyl-substituted oxymethylene radical and $n$ represents 0, 1, 2 or 3, or in which $R_5$ represents —(O—CH$_2$—CH$_2$)$_m$—OCH$_2$—, $n$ represents the integer 1 and $m$ represents 1, 2 or 3. The said alkyl radicals contain 1 to 5 carbon atoms and can be substituted by 0 to 3 halogen atoms, preferably chlorine atoms.

As cyclic ethers there are preferably used ethylene oxide, glycol formal and diglycol formal. Propylene oxide, epichlorhydrin and 4-chloro-methyl-dioxolane may also be used with advantage. Finally there are also suitable cyclic or linear formals of long-chained $\alpha,\omega$-diols, for example butanediol formal or hexanediol formal.

The process according to the present invention is advantageously carried out in such a manner that the substances indicated are distributed in the pulverized polymer by means of a rapid mixer and shaped articles are subsequently molded in the hot in the usual manner.

The advance in the art achieved by the method described above consists in that the surface of the shaped article made from the polymers or copolymers modified according to the process of the present invention is substantially improved. Furthermore, the number and the size of the cracks and fissures developing on the surface and also in the interior are reduced considerably, whereby the mechanical strength and stiffness are distinctly improved. It is due to these improvements that the homopolymers or copolymers of formaldehyde or trioxane that have been modified according to the process of the present invention exhibit distinct advantages in many industrially important fields of application as compared with the products used hitherto.

The following examples serve to illustrate the invention, but they are not intended to limit it thereto.

Examples 1 to 8 (Examples 1 to 5 are comparison examples)

10 grams of a pulverized copolymer of trioxane and 2% by weight ethylene oxide ($\eta_{red}$=1.2 dl/g., measured in butyrolactone at 140° C.), respectively, were mixed intimately with the substances indicated in Table 1 on a rapid analytic mill (Messrs. Janke and Kunkel). Of the mixture thus obtained, approximately 0.1 mm. thick films were pressed on a heatable molding press at 190° C. between hard chrome brass plates, which films were allowed to cool at 100° C. for a period of 10 minutes. Moreover, several milligrams of the powder mixtures prepared as described above were melted at approximately 220° C. between two cover glasses to yield a thin film which was allowed to cool at 100° C. for a period of 10 minutes. A substance was designated as nucleating agent if it produced spherolites which were smaller in size as compared with the untreated sample.

Example 10

$2 \times 10^{-2}$ percent by weight of the substance mentioned under (7) in Table 1 was distributed in 2 kilograms of a pulverized copolymer of trioxane and 2 percent by weight of ethylene oxide on a rapid mixer, and this mixture was granulated.

The surface of injection-molded sheets which had a 4 mm. thickness made of this product and of the untreated material was traced by means of a surface measuring device according to Forster.

It was found that the surface of the nucleated product was scarred to a much less extent than was the case with the comparison material.

TABLE 1

| Ex. | Substance added Structural formula | Concentration (percent by weight) | Efficiency |
|---|---|---|---|
| 1 | p-Tertiary-butyl benzoic acid | $2 \times 10^{-1}$ | − |
| 2 | Na-benzoate | $2 \times 10^{-1}$ | − |
| 3 | Terephthalic acid | $2 \times 10^{-1}$ | − |
| 4 | 3-methyl-acridone | $2 \times 10^{-1}$ | − |
| 5 | Acridine | $2 \times 10^{-1}$ | − |
| 6 | 2,3-dihydroxy-quinoxaline | $2 \times 10^{-1}$ | + |
| 7 | 2,6-dihydroxy-m-benzobis-imidazole | $2 \times 10^{-1}$ | + |
| 8 | 2,2′-dihydroxy-6,6′-bis-benzimidazole | $2 \times 10^{-1}$ | + |

Example 9

10 grams of a pulverized homopolymer of formaldehyde with acetate terminal groups were mixed on a rapid analytic mill with $1 \times 10^{-2}$ percent by weight of the substances enumerated in the Examples 1 to 8. Microscopic examinations of films confirmed the order of efficiency indicated in the last column of Table 1.

Example 11

The gloss of injection-molded sheets which had a 4 mm. thickness and which were made of a copolymer of trioxane and 2% by weight of ethylene oxide to which had been added $1 \times 10^{-3}$ or $5 \times 10^{-4}$ percent by weight of the substance indicated under (8) in Table 1, was measured against 100% black glass standard by means of a universal gloss measuring device according to Lange.

It was found that the products exhibited a gloss that was by approximately 8% higher than that of the comparison product containing no additive. In Table 2 the values obtained are summarized; they represent mean values of 5 sheets, respectively.

TABLE 2

| Percent by weight of additive | $5 \times 10^{-4}$ | $1 \cdot 10^{-3}$ |
|---|---|---|
| Percent against 100% of black glass standard | 79  85 | 85 |

Example 12

Due to the modified spherolite structure the mechanical properties of the polymer were influenced. The properties of a copolymer of trioxane and 2% by weight of ethylene oxide with the addition of $2 \times 10^{-2}$ percent by weight of the substance enumerated under (6) in Table 1 measured in comparison with the untreated product are summarized hereunder. Stiffness and strength of the treated product were distinctly higher than those of the comparison product.

TABLE 3

| Percent by weight of additive | | $2 \times 1^{-2}$ |
|---|---|---|
| Flexural stress (kp./cm.$^2$)[1] | 1,085 | 1,140 |
| Stiffness in torsion 120° (kp./cm.$^2$)[2] | 1,900 | 1,990 |
| Tensile strength (kp./cm.$^2$)[1] | 660 | 690 |
| Ultimate tensile strength (kp./cm.$^2$)[2] | 670 | 730 |

[1] Test specimen taken from injection-molded sheets.
[2] Test specimen taken from pressed sheets.

We claim:

1. In a process for the manufacture of shaped articles of homopolymers of formaldehyde or trioxane or copolymers of formaldehyde or trioxane with an oxygen containing cyclic ether of a ring size of from 3 to 14 members, the improvement of which comprises adding to the polymer prior to molding $10^{-5}$ to $2 \times 10^{-1}$ percent by weight of a compound of the formula

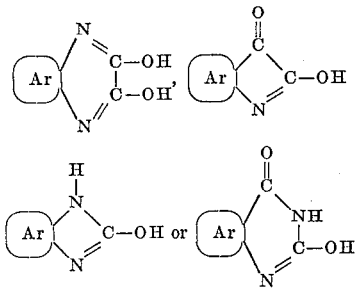

wherein Ar represents benzene, naphthalene or diphenyl, and in which the total heterocyclic grouping may occur once or twice in the molecule.

2. A thermoplastic molding composition consisting essentially of homopolymers of formaldehyde or trioxane or copolymers of formaldehyde or trioxane with a cyclic ether of the formula

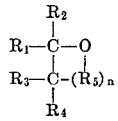

in which $R_1$, $R_2$, $R_3$ and $R_4$ each represent hydrogen, an alkyl radical or a halogen-substituted alkyl radical from 1 to 5 carbon atoms, and in which $R_5$ represents a methylene- or an oxymethylene radical, an alkyl- or a halogenalkyl-substituted methylene radical, or an alkyl- or a halogenalkyl-substituted oxymethylene radical and $n$ represents 0, 1, 2 or 3, or in which $R_5$ represents $-(O-CH_2-CH_2)_m-OCH_2-$, $n$ represents the integer 1 and $m$ represents 1, 2 or 3, and incorporated therein from $10^{-5}$ to $2 \times 10^{-1}$ percent by weight of a compound of the formula

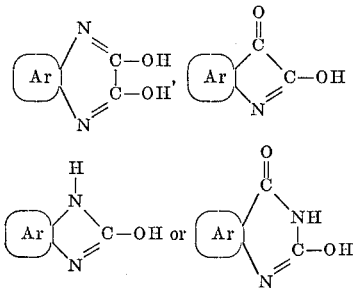

wherein Ar represents benzene, naphthalene or diphenyl, and in which the total heterocyclic grouping may occur once or twice in the molecule.

References Cited

FOREIGN PATENTS 633,389  10/1963  Belgium.

WILLIAM H. SHORT, Primary Examiner.

L. M. PHYNES, Assistant Examiner.

U.S. Cl. X.R.

260—45.8, 67.5